United States Patent [19]

Close

[11] 3,753,119

[45] Aug. 14, 1973

[54] DIGITAL TUNING INDICATOR

[75] Inventor: Ernest Frederick Close, Fort Wayne, Ind.

[73] Assignee: The Magnavox Company, Ft. Wayne, Ind.

[22] Filed: Apr. 7, 1971

[21] Appl. No.: 132,012

[52] U.S. Cl....................... 325/455, 331/64, 334/86, 334/87

[51] Int. Cl............................................. H04b 1/06

[58] Field of Search...................... 325/455; 329/111; 331/64; 334/86, 87

[56] References Cited

UNITED STATES PATENTS

| | | | |
|---|---|---|---|
| 3,244,983 | 4/1966 | Ertman | 325/455 |
| 3,509,484 | 4/1970 | Basse | 325/455 |

*Primary Examiner*—Albert J. Mayer

*Attorney*—Richard T. Seeger and Jeffers & Rickert

[57] ABSTRACT

A digital tuning indicator for a multiple band heterodyne type receiving device is disclosed which is capable of displaying the frequency to which the receiving device is tuned for AM and FM reception in kilohertz to the nearest kilohertz and in megahertz to the nearest one-tenth megahertz respectively, and of displaying the channel to which the device is tuned when receiving UHF television. The indicating system comprises a counter, the contents of which are periodically displayed. The counter contents are preset to a value which reflects the intermediate frequency of the particular band and a submultiple of the corresponding local oscillator frequency is gated into the counter for a prescribed time interval whereby the resultant sum in the counter at the end of the prescribed time interval reflects the actual received frequency or the corresponding channel number.

13 Claims, 8 Drawing Figures

INVENTOR
ERNEST F. CLOSE
BY Jeffers and Rickert
ATTORNEYS

INVENTOR
ERNEST F. CLOSE
BY Jeffers and Rickert
ATTORNEYS

INVENTOR
ERNEST F. CLOSE
BY Jeffers and Rickert
ATTORNEYS

INVENTOR
ERNEST F. CLOSE
BY Jeffers and Rickert
ATTORNEYS

INVENTOR
ERNEST F. CLOSE
BY Jeffers and Rickert
ATTORNEYS

INVENTOR
ERNEST F. CLOSE
BY Jeffers and Rickert
ATTORNEYS

DIGITAL TUNING INDICATOR

BACKGROUND OF THE INVENTION

The present invention relates to digital tuning indicators for heterodyne type receivers and more especially to such a digital tuning indicator for an AM/FM combination receiver. Digital tuning indicators are not new and the present state of the art is well represented by the patent to Ertman U.S. Pat. No. 3,244,983. The Ertman structure employs a counter, the contents of which are periodically sampled and displayed. The Ertman receiver has a low frequency local oscillator, the output of which is fed to a frequency multiplier to obtain the desired high frequency "local oscillator" signal for injection into the mixer circuit of the receiver and also supplies this low frequency local oscillator signal to a gate which gates for an appropriate time interval this low frequency signal into the counter. Due to his use of a low frequency local oscillator and frequency multiplication, Ertman must necessarily vary his gating time depending upon the multiplication factor chosen. This variable gating time results in an unnecessarily complex circuit. Ertman is further limited to displaying frequency whereas it is desirable for example, in UHF television reception to display channel number indications rather than frequency.

A digital approach to the problem of obtaining a digital tuning indication from local oscillator output signals is desirable for a number of reasons. The frequency of the local oscillator signal is usually the sum of the incoming carrier frequency and the intermediate frequency although in some cases this local oscillator frequency may be the difference of the incoming and intermediate frequencies. A first approach to the problm might be a "reheterodyning" procedure where the local oscillator signal was beat against the intermediate frequency signal and the difference of these two signals appropriately filtered and used to energize the tuning indicator. Such a nondigital approach or actual heterodyning scheme is unacceptable because it generates frequencies at the intermediate frequency and/or the incoming carrier frequency as well as their harmonics and subharmonics causing a multitude of interference problems. Such an actual heterodyning scheme is also unacceptable because channel number indications are not available.

Some form of digital tuning indicator is of course highly desirable and represents a substantial advance over presently used inaccurate dials which are inherently difficult to read and which are often nonlinear adding to the reading difficulty. Actual heterodyning or approaches such as represented by the aforementioned Ertman patent have not proved satisfactory.

SUMMARY OF THE INVENTION

The present invention eliminates the aforementioned prior art problems by producing a pseudo heterodyning effect by presetting a frequency counter to a prescribed value and then counting for an accurately measured time interval a submultiple of the local oscillator frequency. The resultant count is, of course, displayed and in accordance with the present invention and this resultant count may be either a channel number or an actual frequency. In the disclosed preferred embodiment, the system is a multiple band heterodyne type receiver and the several local oscillator frequencies are divided by differing amounts and then fed to the counter for a prescribed interval. Due to the division by different amounts for different bands, the time during which the submultiples are supplied to the counter may be the same for all bands. In some embodiments, the division may be by 1 for one of the bands.

In accordance with yet another feature of the present invention, the lowest order decimal digit of the counter has no corresponding display unit and the numerical value preset in the counter for actual frequency display purposes differs in this lowest order counter position from the actual intermediate frequency or its complement. This prevents display variations for minor variations in the incoming frequency as well as other minor variations within the system. For channel number indications, the value preset in the counter is not the intermediate frequency or its complement but is, however, mathematically related thereto.

Accordingly, it is one object of the present invention to provide a digital tuning indicator for a multiple band receiver.

It is another object of the present invention to provide a digital tuning indicator capable of displaying channel numbers as well as frequency.

It is a further object of the present invention to provide a cheaper and more reliable digital tuning indicator which eliminates the pulse stretchers, delay units, frequency multipliers and other complexities of prior art digital tuning indicators.

It is a still further object of the present invention to provide a digital tuning indicator which does not change indication in response to insignificant variations in the received or locally generated signals.

Yet another object of the present invention is to achieve one or more of the foregoing objects using economical and easily available integrated circuit components.

These and other objects and advantages of the present invention will appear more clearly from the following detailed disclosure read in conjunction with the accompanying drawing:

DESCRIPTION OF THE PREFERRED EMBODIMENT

Figure 1:
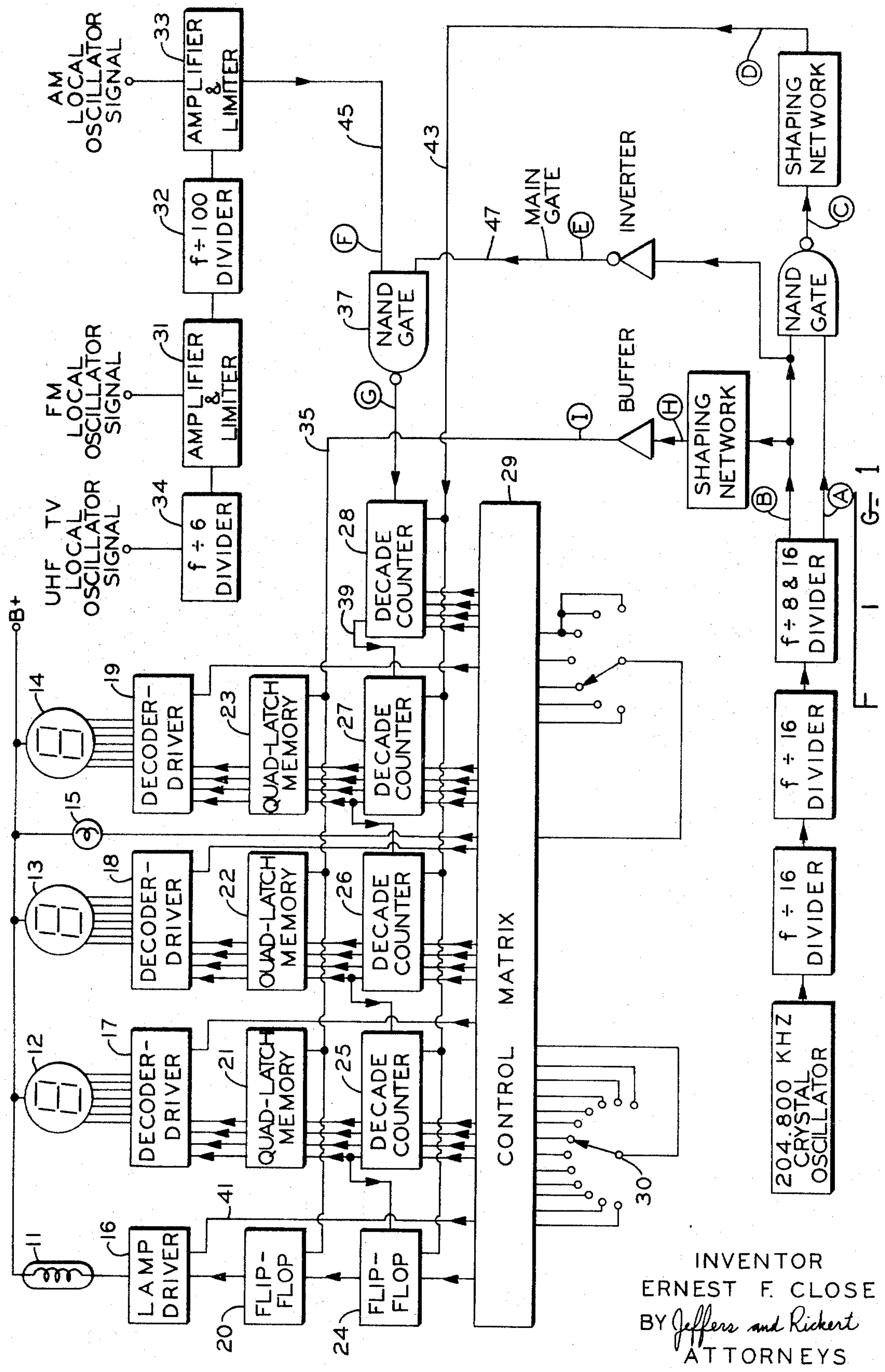
FIG. 1 is a block diagram of one embodiment of an improved digital tuning indicator for use in conjunction with a multiple band heterodyne type receiver.

Turning first to the block diagram of FIG. 1, the present invention will be explained by first giving a general description of the operation and then examining the more important aspects in considerable detail. The system output comprises five visual output devices 11, 12, 13, 14 and 15. Display device 11 is a simple two state device such as a tubular incandescent lamp and is capable of displaying only a one or the lack thereof. This highest order digit is needed for example on AM or FM bands and is blanked or disabled for example when the system is used to indicate channel numbers for UHF or VHF television. Display devices 12, 13, and 14 may be Numitron incandescent type seven segment tubes manufactured by the Radio Corporation of America, however, a wide range of display units including Nixie tubes, seven segment fluorescent tubes, light emitting diode arrays, liquid crystal panels and many others could be used with equal facility by suitable changes in the decoding and driving circuitry. The display device 15 is used only to provide the decimal point needed, for example, when displaying FM frequency tuning and may typically be a small incandescent bulb, light emitting diode, neon lamp or other similar display element either as a separate device or included within either display device 13 or 14.

Figure 4:
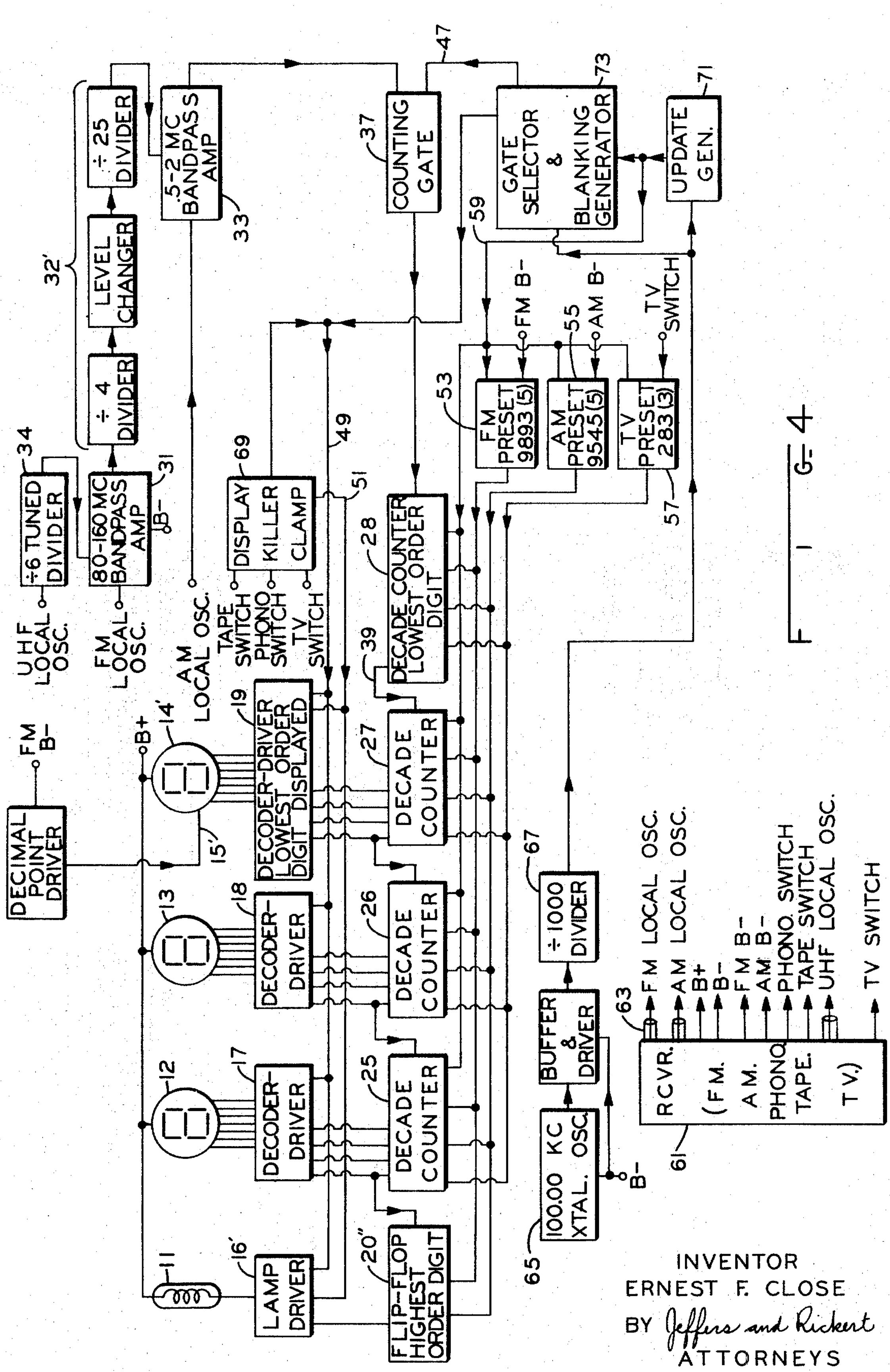
FIG. 4 is a block diagram of an alternate system to that of FIG. 1.

Each of the display devices 12, 13 and 14 is driven by a decoder-driver circuit 17, 18 and 19 respectively which may be an RCA type CD2501E combination decoder and driver as illustrated in FIGS. 1 and 4 or a Motorola type 7448 decoder followed by seven driver transistors as illustrated in FIG. *5a*. Each of the decoder-driver circuits converts an incoming binary code into the appropriate code for energizing its corresponding display device. The decoder-drivers have blanking inputs connected to the control matrix 29 which serve to extinguish the corresponding display device when energized. In other words, all displays will be extinguished when the receiver is being operated in a mode not requiring a frequency or channel number display and for example, such modes would include operating as a phonograph or tape recorder or play back unit. Only certain ones of the display units will be extinguished during other modes of operation for example, displays 11 and 14 will be extinguished when the receiver is being operated in a television mode and additionally display 12 may be extinguished during VHF TV operation on channels 2 through 9. Display device 15, is of course, directly energized or extinguished depending upon the mode of operation of the receiver.

Figure 2:
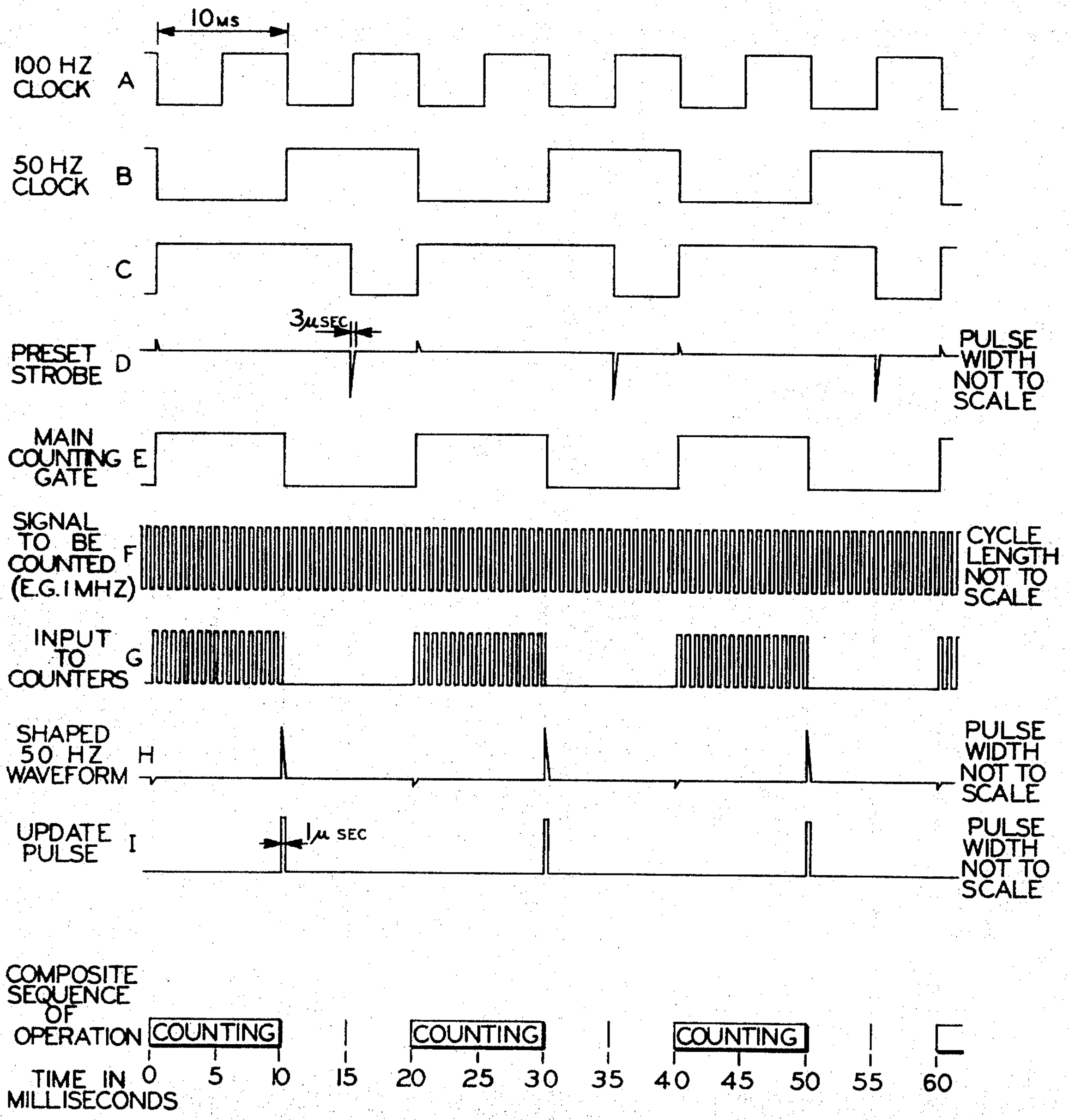
FIG. 2 is a timing diagram showing wave forms at selected points in the circuit of FIG. 1.
Figure 3:
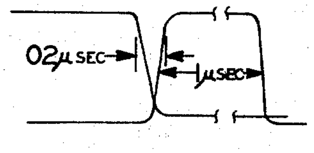
FIG. 3 is an expanded detail showing of the up-date pulse and counting gate signals of FIG. 2.

The decoder-driver circuits receive their inputs from a memory register or registers such as respective quadlatches 21, 22 and 23 which may, for example, be Motorola type 7475 integrated circuits. This memory register receives and stores information from the main counters 25, 26 and 27 when an up-date pulse on line 35 actuates the memory modules at the end of the counting interval. This up-date pulse is depicted by wave form I in FIG. 2 and has a 1 microsecond duration as illustrated in FIG. 3. Since the information stored in the memory registers 21, 22 and 23 does not vary except during the up-date pulse, the display does not flicker as it might if only intermittently energized between counts as is often done in less sophisticated circuits. The memory register serves the additional purpose of allowing the main counters to operate without disturbing the display until the counting sequence has been completed.

The main counting function is performed by a counter having stages 24, 25, 26, 27 and 28. Stage 24 which corresponds to the highest order digit to be displayed is a J-K flip-flop while the remaining counter stages are decade counters having the normal interconnection which causes a given stage to increment by one each time the preceding stage has incremented by 10 and having individual inputs from the control matrix 29 which allow an arbitrary count to be inserted directly by means of so-called preset inputs. Signetics type N8280A counters have been found satisfactory for this embodiment. The pulses to be counted are applied to the decade counter 28 which is the lowest order digit of the counter and the contents of which are not displayed from the gate 37. The gate 37 is illustrated as a "nand" gate having an inverted output which is logically equivalent to the better known "and" gate and hence a one will be supplied to the lowest order decade counter 28 each time signals concur on the two input lines to the gate 37. Counter 28 increments counter 27 each time it reaches its full internal count of 10 and similarly each time decade counter 27 receives ten increment signals on the line 39, it in turn increments the decade counter 26 by one. This, of course, proceeds throughout the entire counter chain until the highest order digit counter 24 which in this example is a simple flip-flop is reached. The flip-flop 24 also increments by one each time it receives an indication from the next lower counter stage that a full count has been attained, however, successive incrementing of the flip-flop 24 merely results in its changing state from zero to one to zero and so on. A zero state is of course indicative of a theoretical sum which is an even number and a one state indicates its theoretical sum to be odd. The binary outputs of the counter stages 25, 26 and 27 are connected to the inputs of the quadlatches 21, 22 and 23 for ultimate display but no memory register, decoder driver, or visual display element is associated with the counter stage 28. This extra undisplayed counter serves to conceal the possible one count ambiguities which occur in counting circuits of this type arising from the fact that the opening and closing of the counting gate is not synchronized with the signal being counted and hence the number of pulses admitted may vary by one depending on the relative timing of the gate opening.

Returning for the moment to the visual display unit 11, since only a single digit one or the lack thereof need be displayed no decoder is required and a simple one transistor amplifier may be used to drive the lamp 11. This driver circuit which is more fully illustrated in FIG. *5a* as built around the NPN transistor 16' has provision for blanking or turning off the corresponding display as a result of commands from the control matrix 29 by way of line 41. As seen in FIGS. *5a* and *5b* this in essence amounts to the receiver being set for UHF or VHF television reception and this blanking command overrides the regular input to the lamp driver 16 from the flip-flop 20. Similarly, only a single flip-flop 20 is required to remember the one bit of information displayable by the lamp 11 and hence the corresponding memory register stage for this display element consists of a simple flip-flop 20. In actual practice, a J-K flip-flop is used for the high order memory element so that the up-dating function can be easily implemented in a manner analogous to the use of the quad-latches in the other display circuits. Similarly, a J-K flip-flop is used as the counter stage 24 for this high order digit since the presetting of this as well as the other counter stages may be easily effected and successive counting cycles made independent of the results of previous counts. As will by more apparent, subsequently the display element 11 if energized at all for a given mode of reception must have its flip-flop 24 preset to a one prior to a counting cycle and while in other environments, the high order display and associated circuitry might be constructed similar to the subsequent stages for the particular purposes of the present preferred embodiment the one condition is permanently wired in by connection of the preset strobe pulse signal to the appropriate terminal of the flip-flop. In other words, each time the command is given for the several counter stages to be preset, the flip-flop 24 automatically assumes its one state. This preset strobe signal has wave shape D as illustrated in FIG. 2 and appears on line 43 in FIGS. 1 and *5a*. Of course, in for example a short wave band receiver, the need of a highest order digit which was other than a 1 might well arise and similarly the number of digits required might be increased or decreased as needed for greater or lesser accuracy. As disclosed in the embodiments of FIGS. 1 and 4, the entire counter is capable of counting up to 19,999 however, the lowest order digit is not displayed.

The control matrix 29 of FIG. 1 performs the functions of blanking certain displays, inserting VHF TV channel numbers directly into the preset inputs of the counters and inserting certain mathematically derived preset numbers into the counter to secure proper operation on the AM, FM and UHF TV bands. For VHF operation no signals are applied to the normal counting input from the gate 37 and the channel number is merely stored in the counter and displayed as soon as an up-date pulse occurs on line 43. This system for VHF display is simply more expedient since virtually all VHF tuners are of the detent type and it is a relatively simple matter to add an additional function 30 to the switch. The last mentioned additional switching function represented as 30 in FIG. 1 may in fact be several switch stages ganged together to the VHF tuner shaft as illustrated in FIG. *5b*. This ganged switch of FIG. *5b* and the associated diodes effect the conversion of the switch position to a binary number since the inputs of the several counter stages are arranged to accept binary information. The last mentioned diodes as well as the several diodes just below the counter stages illustrated in FIG. *5a* form a portion of the control matrix 29 which performs the function of presetting the several counter stages. It is, of course, extremely difficult to draw a line around those elements in FIGS. *5a* through *5c* which lie within the control matrix 29 of FIG. 1, however, it is felt that as the explanation progresses the functions of the control matrix 29 will become abundantly clear.

To illustrate the presetting function assume that the receiver is set for FM reception and that it is tuned to receive a station at 98.7 megahertz. The control matrix 29 turns on visual display 15 to provide the decimal point indication. Matrix 29 also supplies a preset number to counters 24, 25, 26, 27 and 28 which is expressed as 989.35 in decimal notation although the actual signals to the preset inputs of the counters are in binary coded decimal form. To be specific, each counter 25, 26, 27 and 28 has four preset input terminals which referring to FIG. *5a* and the Signetics type N8280A counters function as follows: supplying a logical one to terminal 4 sets a one into the counter, supplying a logical one to terminal 10 sets a two into the counter, supplying a logical one to terminal 3 sets a four into the counter, and supplying a logical one to terminal 11 sets an eight into the counter. It will be recognized that energizing the proper terminals by means of the diode matrix will allow any desired number from zero to nine to be set into each counter. In the present environment, the counters are, of course, restricted to binary coded decimal usage. Diodes are used in the matrix for isolation purposes since a given preset terminal on a given counter may have to be energized on more than one function but not on all of them. For example, if only AM and FM operation are contemplated no diodes are required in the presetting matrix section of control matrix 29. As a specific numerical example, for FM operation counter 25 has a 1 supplied to terminal 11 to preset its contents to 8, counter 26 has a 1 supplied to terminals 4 and 11 to set its contents to 9, counter 27 has a 1 supplied to terminals 4 and 10 to set its contents to 3, and counter 28 has a 1 supplied to terminals 4 and 3 to set a 5 in this lowest order digit position. As noted earlier, the high order digit is always set to 1 by the preset strobe pulse. Simply, energizing the preset terminals of the counters causes no change in the contents until a preset strobe pulse is applied to the proper terminal, terminal 1 in the case of the Signetics type N8280A.

As will appear more clearly from subsequent numerical examples, the flip-flop 24 which is the counter stage for the high order digit should mathematically be set to a nine, however, this particular stage is capable of only one to zero representation. Since the necessity for displaying a nine in this position never occurs, it is only necessary to set the counter to a condition mathematically one less than zero so that adding one count produces a zero or blank status and adding two counts will result in displaying a one. Thus, setting the flip-flop 24 to its one or odd state gives the desired end result even though it cannot contain a nine. This approach of course fails if it is esired to display a two or other decimal number in the highest order position and the higher order stage would have to more nearly approximate the lower order stages under these circumstances, for example, when it is desired to display frequencies in the short wave band.

To resume the earlier numerical example, the number 989.35 is set into the several counter stages by preset strobe pulse D in the timing diagram which occurs on line 43 and sometime later (5 milliseconds in the present embodiment) the main counting gate 37 is enabled to pass the signals appearing on line 45 for exactly 10 milliseconds as determined by the gating signal on line 47 and illustrated as wave form E in FIG. 2. This wave form is derived from a crystal oscillator the output of which is divided several times and inverted. The signal to be counted appearing on line 45 is obtained by taking a small sample of the signal from the FM local oscillator amplifying it in an amplifier limiter 31 and dividing its frequency by 100 in the digital divider 32 after which it passes through an amplifier limiter 33 to the counting gate 37. FIG. 2 illustrates how this incoming signal F from amplifier 33 is gated by the wave form 80 to provide the output wave form G. When the receiver is uned to 98.7 megahertz its local oscillator will be operating at 98.7 plus 10.7 or 109.4 megahertz assuming the normal 10.7 megahertz intermediate frequency. After division by 100, the signal F of FIG. 2 has a frequency up 1.094 megahertz. Since the gate 37 passes this signal for precisely 10 milliseconds, 10,940 pulses are passed into the counter. When this count of 10,940 is added to the 98,935 preset into the counter a total of 109,875 results.

At this point, two novel features of the present invention correct this somewhat strange number to give the proper indication of the frequency to which the FM receiver is tuned. It should first be noted that the capacity of the counter has been exceeded and the highest order digit of the sum is no longer present anywhere in the counter and the highest order stage of the counter flip-flop 24 is storing the next highest order digit of the sum, namely a zero. The nine, eight and seven are stored respectively in the counter stages 25, 26 and 27 and the five is stored in counter stage 28 which of course will not be displayed. Therefore, the proper number sequence 09,875 is stored within the counter.

In order for these numbers to be displayed, they must first be transferred to the memory described previously as consisting of flip-flop 20 and quad-latch memories 21, 22 and 23. The digital information is transferred to the memory upon the occurence of up-date pulse I of FIG. 2 being applied to the proper terminals which in the case of the type 7,475 quad-latches are terminals 4 and 13. As may be seen by comparing wave forms E and I of FIG. 2, the up-date pulse occurs immediately after the closing of the counting gate 37. In the present ebodiment, this up-date pulse is derived from the 50 hertz timing wave form B by differentiating and amplifying to generate wave form H which upon buffering becomes the up-date pulse I. In the present preferred embodiment, this up-date pulse occurs about 0.02 microseconds after the counting gate has been disabled. The precise timing is not highly critical, however, the important feature is the sequence of operations, namely to preset the counters then begin counting for a precise interval of time and then to up-date the memory contents. When the up-date pulse has caused the memory registers 20, 21, 22 and 23 to accept the sum stored in the counters, the information is immediately displayed on the visual display as 98.7 which is precisely the desired result. Since the memory register will retain this count until the next up-date pulse the counters may be preset and counting resumed without disturbing or creating any flickering in the display.

While the principles of the present invention could be used to display VHF channel numbers or frequency by counting a submultiple of the local oscillator frequency for a precise time interval the present preferred embodiments achieves the VHF channel number display by adding further switching functions to the already present detent type VHF tuning switch. A digital tuning indication of a particular channel in the UHF band is not so easily obtained. When the receiver is operating in the UHF band, it supplies signals having the same frequency as the UHF local oscillator (which signals may in fact by the UHF local oscillator output) to a divide by six tuned divider 34 whicy may as a practical matter be built as part of the UHF tuner. The output of this divide by six divider 34 is substituted for the previously described FM local oscillator signal and except for the action of the control matrix 29 to suppress the indicators 11 and 14 the remaining operation of the circuit is virtually identical to that previously described for the FM frequency indication. This operation will, however, again be described for the display of a channel number in order to clarify some of the timing sequences involved as well as to illustrate how channel numbers rather than frequency are ultimately displayed.

Assume that for the particular UHF receiver involved, the picture carrier intermediate frequency is 45.75 megahertz and that it is desired to tune to channel 14. Under these circumstances, the local oscillator frequency would be 517 megahertz. As noted earlier, the normal heterodyning process is to supply a local oscillator signal which exceeds the incoming signal by the intermediate frequency. It is possible to reverse these rolls and in that event the number ultimately selected to be inserted from the control matrix 29 into the several counter stages should be the complement of those herein described. Returning to the UHF numerical example, the 517 megahertz signal is substituted for the previously described FM local oscillator signal after being divided by 6 in the divider 34. Thus, the signal supplied to the bandpass amplifier 31 has a frequency of 86.17 megahertz which is within the bandpass characteristics of the amplifier. The bandpass characteristics will be discussed in more detail in reference to FIG. 4. Divider 32 effects a second division on this signal and supplies the twice divided signal to bandpass amplifier 33. The input to 33 has a frequency of 0.8617 megahertz. The counting gate 37 is open for one one-hundredth of a second thus supplying a train of 8,617 pulses to the several stages of the counter. The counter stages already contain the number 2,833 as preset therein from the control matrix 29 so that the resultant or sum of these two numbers after gating appears in the counter as 11,450. As noted earlier, the lamp driver 16 is disabled due to the presence of suppression signal on line 41 so that the highest order digit (one) is not displayed. The lowest order digit zero appearing in the decade counter stage 28 is never supplied to the display and the next lowest order digit appearing in the counter stage 27 (five) is suppressed again due to the presence of a signal from the control matrix 29 to the decoder-driver 19. Thus, the only digits displayed are a one in display unit 12 and a four in display unit 13. The tuning to the exact middle of chanel 14 has thus successfully been displayed. The arithmetic involved in the display of any other channel number should now be obvious particularly when it is remembered that the control matrix 29 presets the several counter stages to 2833 for all UHF operation.

Figure 5A:
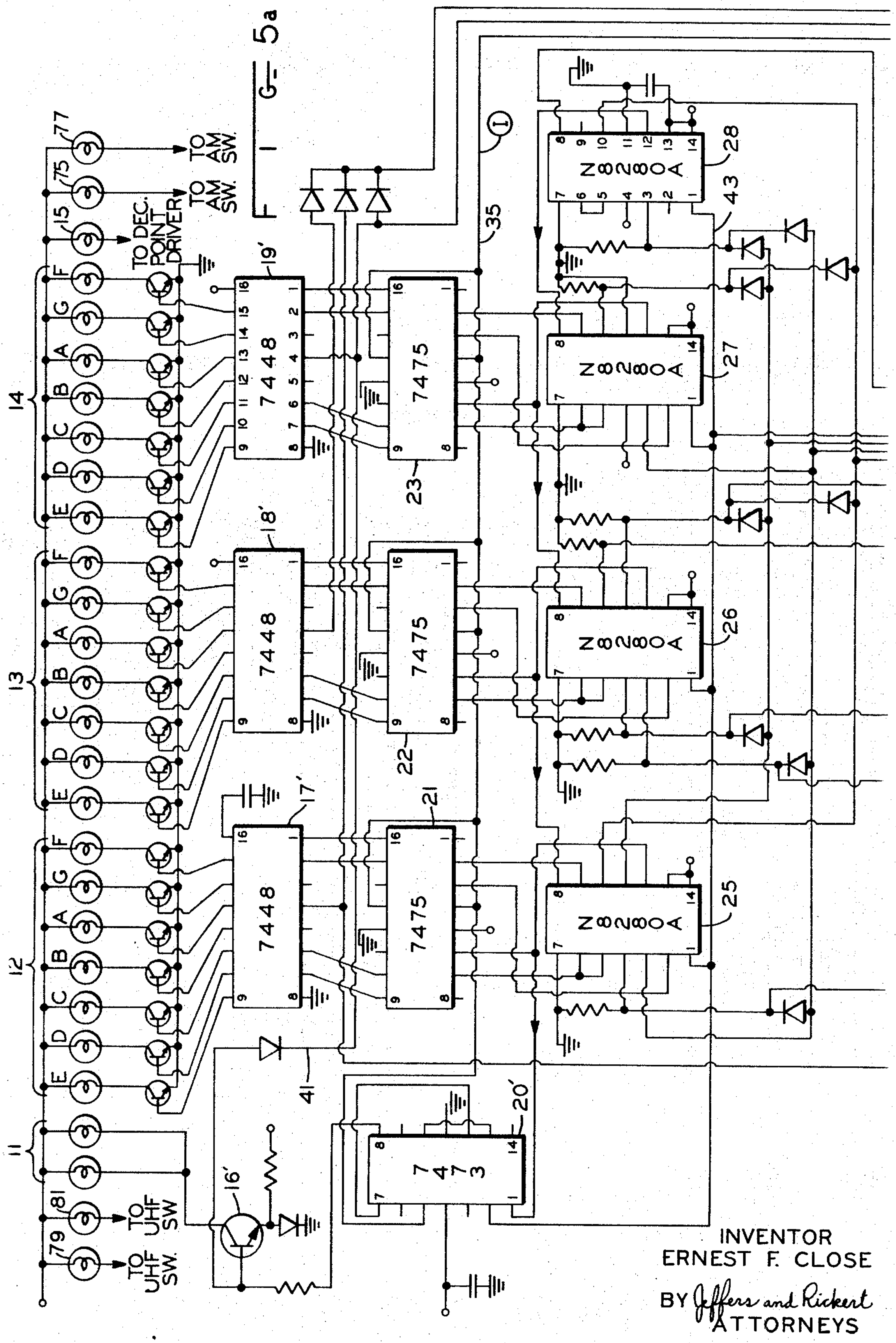
FIGS. 5*a*, 5*b* and 5*c* taken together constitute a schematic diagram for the system illustrated in FIG. 1.
Figure 5B:
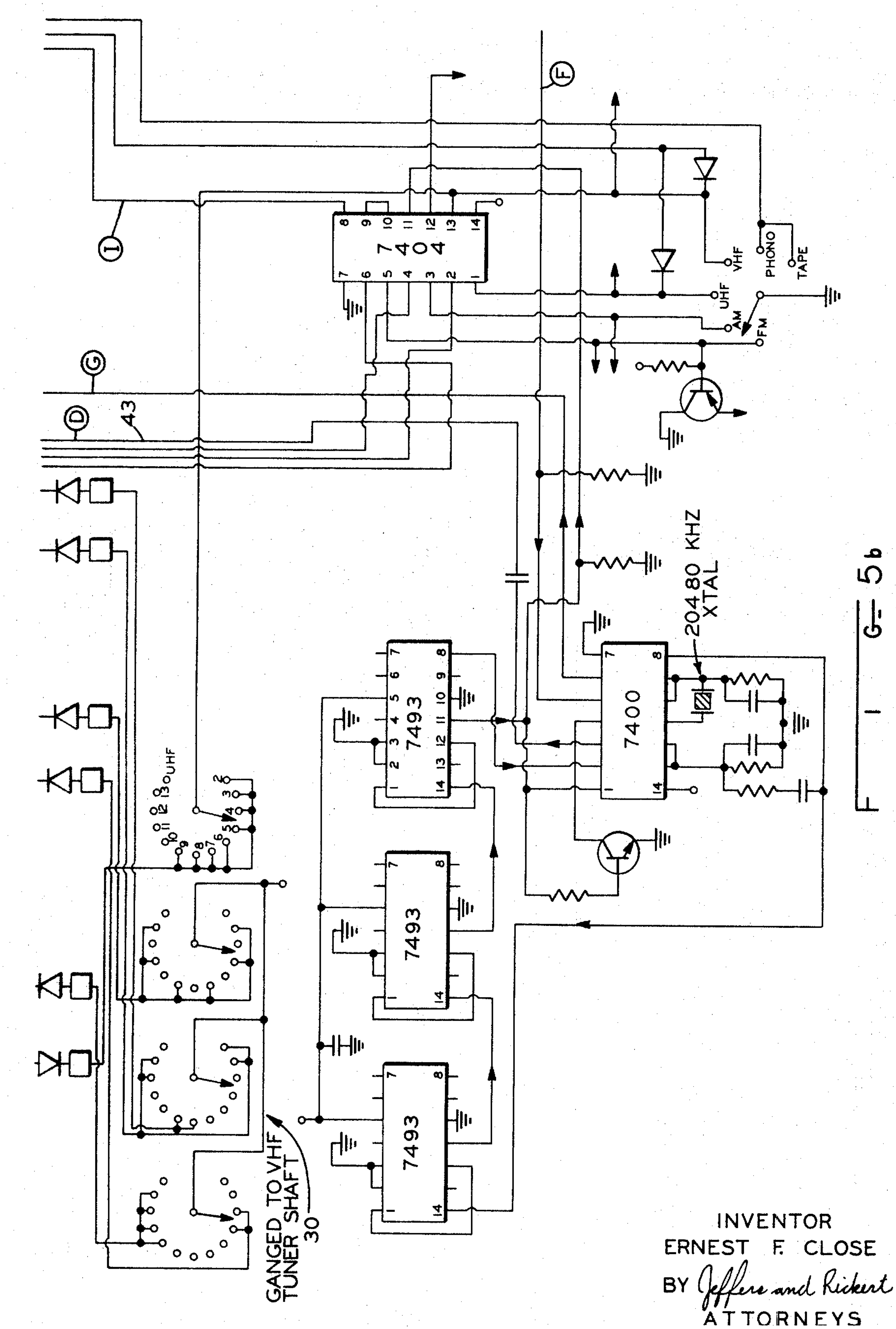
Figures 5C, 6:
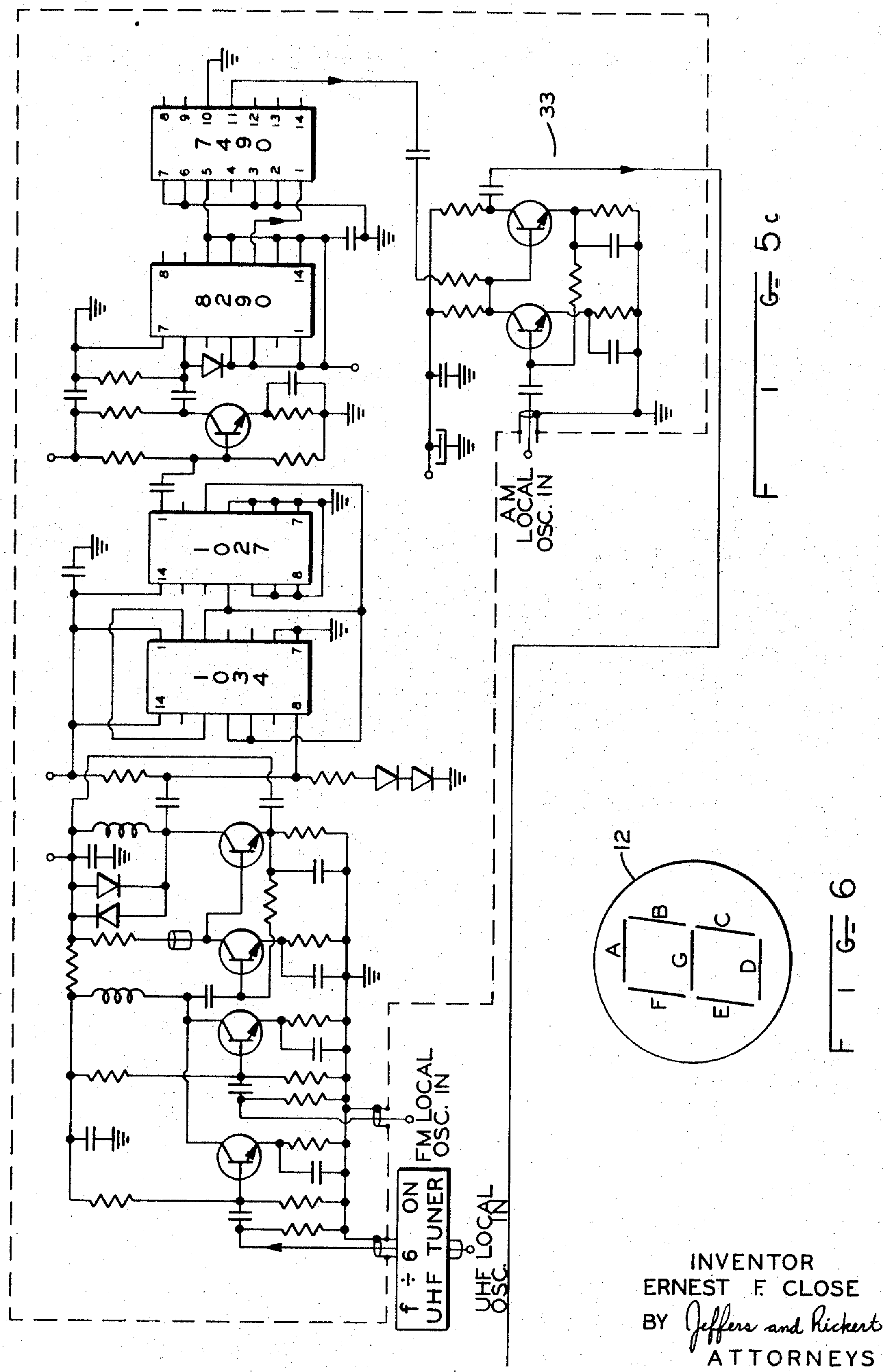
FIG. 6 illustrates a Numitron tube with its seven segments labeled to correspond to the labeling of the several filament elements at the top of FIG. 5*a*.

Turning now to the block diagram of FIG. 4, the present invention will be explained moving backward through an alternate to the system illustrated in FIG. 1. It should be noted that elements in FIG. 4 as well as FIGS. 5*a* through 5*c* which bear the same reference numeral as corresponding element in FIG. 1 are substantially identical to those elements in FIG. 1 whereas elements which are differently illustrated or implemented in a somewhat different manner bear a reference numeral having a prime and in some instances a double prime to distinguish them from the elements in FIG. 1 which perform a similar function. Thus, for example, the low order digital display 14' contains within the same display device a decimal point indicator 15' whereas in FIG. 1 the decimal point indicator was a separate visual display device. Similarly, the divide by 100 divider 32 of FIG. 1 is implemented differently in FIG. 4 using a divide by four divider and a divide by 25 divider between which is required a level changer to make the two particular dividers compatible. In FIG. 4 the visual display which indicates frequency or channel comprises four visual output devices 11, 12, 13 and 14'. Of these, the display device 11 is a simple two state device capable of indicating a one or the lack thereof. This display device 11 is the highest order digit position of the display system and in AM, FM or UHF broadcast reception this highest order digit, if required at all, can only be a one. The remaining display devices 12, 13 and 14' are Numitron incandescent type seven segment display devices, for example, as illustrated in FIG. 6. Each of the Numitrons is driven by a decoder divider 17, 18 and 19 respectively which serves to convert an incoming binary code into the appropriate code for energizing the readout device. The particular output code, of course, depends upon the particular readout device employed. Each of the decoder-drivers 17, 18 and 19 also has a "killer" input connected to the line 49 and in some instances the line 51 and the appropriate signal or lack thereof on either line 49 or line 51 serves to extinguish the display device involved. Such a signal on line 51 serves to extinguish display devices 11 and 14' and occurs in response to the system operating in a UHF television mode. The lamp driver 16' has inputs connected to both suppression lines 49 and 51 and this driver 16' is of course effective to supply the requisite power to the high order digit indicator 11 only when no suppression signal is present on either line 49 or 51 and when its remaining input from the flip-flop 20'' is energized. The flip-flop 20'' represents a simplified counter stage analogous to flip-flop 20' of FIG. 5*a* and fulfills the function of both the memory flip-flop 20 and the counter flip-flop 24 of FIG. 1. The remaining counter stages 25, 26, 27 and 28 may be identical to the corresponding counter stages of FIG. 1, however, the counters themselves are relied on for the memory function previously served by the quad-latch memories 21, 22, and 23 of FIG. 1. These counters function in the same manner as the counters of FIG. 1 and have an overall maximum count capacity of 19,999 to thus form a modulo 20,000 counter. The overall counter is also illustrated as having a number of inputs from several preset registers 53, 55 and 57. The specific nature of the last three mentioned registers is not particularly relevent and the only requirement is that they be capable of supplying on command a specific five place (four in the case of register 53) decimal digit to the five stage counter. The three registers may be of a nondestructive readout variety such as a diode matrix and only one register is operative for a given band of reception to supply a predetermined number regardless of the particular tuning within that given band.

For the purposes of illustration assume that the receiver is set for FM operation and thus the register 53 is energized or enabled due to the presence of the FM B- potential whereas the registers 55 and 57 are not enabled due to the lack of a corresponding enabling signal. Under these circumstances, the register 53 will supply the decimal number 98,935 to the appropriate stages of the counter each time it receives a signal on line 59. The output from the register 53 is illustrated as but a single line, however, in practice, this output would in all probability be a four line parallel readout to the several counter stages simultaneously all in accordance with well known prior art digital procedures. As noted earlier, the flip-flop 20'' which represents the highest order digit position in the counter is capable of only two states and the critical reader may inquire as to how this flip-flop will respond to a nine. The flip-flop 20'' has its single output lead energized when the flip-flop represents a one so that the one display indicator 11 will be energized. In fact, this flip-flop has its output energized when the highest order digit position is a one or theoretically any other odd decimal digit whereas the output is deenergized to represent a highest order digit of zero or any even decimal digit.

The number 98,935 which is reptitively supplied by the register 53 on command was not arbitrarily selected. To take a particular numerical example, assume that the intermediate frequency of the FM receiver is 10.7 megahertz and that the FM receiver is tuned to receive a 98.6 megahertz signal so that the local oscillator is supplying a 109.3 megahertz signal from the receiver portion 61 by way of the coaxial cable 63 to the bandpass amplifier 31. This 109.3 megahertz signal is, of course, within the limits of the band-pass amplifier and is thus supplied to the divide by 4 divider which in turn supplies a 27.3 megahertz signal to the divide by 25 divider. This second divider supplies a 1.093 megahertz signal to the bandpass amplifier 33 which again is within the specified limits and is supplied in turn to the counting gate 37. This counting gate 37 accordingly will supply this 1.093 megahertz signal to the several counter stages for an accurately determined period of time defined by an enabling signal on line 47. The ultimate source of this enabling signal is the 100 kilohertz crystal oscillator 65.

The 100 kilohertz signal obtained from the crystal oscillator 65 is appropriately supplied to a divide by 1,000 divider 67 which supplies a clocking signal at 100 cycles per second to effect the up-dating and blanking and enabling of the counting gate. Specifically the counting gate 37 is enabled for one one-hundredth of a second to pass 10,930 of the pulses being presented to the counting gate from the bandpass amplifier 33. Thus, a count of 10,930 is added to the already present count of 98,935 to produce a resultant sum in the counter of 109,865. As with the previous discussion, the high order digit of this sum is no longer present in the counter since its capacity has been exceeded, flip-flop 20'' is storing the zero, the 986 will be displayed respectively on display devices 12, 13 and 14' and the five, the lowest order digit of the sum which is stored in counter stage 28 will not be displayed. The decimal point indicator 15' is energized by the FM B- level so as to display the 98.6 indication desired.

Several timing functions necessary for the above sequence of operations should now be clear to those of ordinary skill in the art. As noted earlier, the two lines 49 and 51 supply inhibit signals to the lamp driver 16' and some of the decoder-drivers 17, 18 and 19 so as to selectively extinguish certain of the display indicators. Line 49 when appropriately energized suppresses all of the digital readout positions and this line is energized with a blanking signal from the gate selector and blanking generator whenever anything other than the resultant or final count is stored in the counter stages. Clearly, this lanking signal could be either an inhibiting or enabling signal depending on the specific logic involved in the several driver stages. The blanking of all of the display elements is also achieved by a blanking signal on line 49 whenever the receiver is being used in some way in which frequency or channel number indications would be inappropriate, for example, as a phonograph or tape recorder or playback. Such blanking is achieved by a display killer clamp circuit 69 which is responsive to tape or phonograph switches in the receiver 61 to supply the blanking signal by way of line 49. The display killer clamp 69 also supplies a partial blanking signal to line 51 which is effective to suppress the highest order digit display 11 and the lowest order digit display 14' in response to the receiver being set in a TV reception mode.

The astute reader will have noticed by this time that the numbers supplied to the preset section of the control matrix 29 of FIG. 1 or the several preset registers 53, 55 and 57 of FIG. 4 are not the mathematically precise values for an accurate indication of frequency (the tens complement of the intermediate frequency) but rather differ in their least significant digit position from the expected. Taking the AM preset function as an example for variety, 95,455 is preset into the counters on appropriate energization of the counters and the preset register 55 whereas the generally accepted AM intermediate frequency of 455 kilocycles would lead one to expect the preset value to be 95,450. The AM local oscillator frequency is gated into the decade counter stages for one one-hundredth of a second without division or multiplication of that frequency, in other words, the ratioing for the AM band is one whereas the rationing for the FM band was one one-hundredth and the rationing for the UHF band was one six-hundredths. Assume now that an AM station operating at 1,380 kilohertz is tuned and therefore that the local oscillator frequency is 1,835 kilohertz. Obviously, gating this value directly into the counter will display 1,835 instead of the proper 1,380. Simply shortening the counting interval by leaving the gate 37 open for a lesser length of time would provide a correct reading only at this one spot in the band. In order to work over the entire AM and 455 must be subtracted from the potentially displayed 1,835. As noted earlier, a heterodyning scheme is impractical but by suitably presetting the counter before starting the actual count the desired result may be obtained for the entire band. Specifically, if the counter is started 455 "below zero" the correct result will invariably be obtained. The "below zero" number is found by subtracting 455 from 10,000 to obtain 9,545 which is the complement of the intermediate frequency. The undisplayed digit appearing in decade counter stage 28 should theoretically be zero, however, as is well known, the AM radio channels are 10 kilohertz wide and centered at for example, 1,380 kilohertz. Thus, a slight misalignment to 1379.9 kilohertz will result in an indication of 1,379 kilohertz and minor variations in alignment due to temperature changes or varying line voltage might result in the digital indicator flickering back and forth between 1,379 and 1,380. This situation is undesirable and is easily avoided by presetting 95,455 instead of 95,450 in the counter. Similar arguments lead to the selection of 98,935 as an FM preset value and 2,833 as a preset value for UHF operation.

To illustrate that the preset value yields the correct result throughout the entire band involved assume now that the AM receiver is tuned to a station operating at 710 kilohertz. Under these circumstances, the ocal oscillator will be generating a 1,165 kilohertz signal and this, when gated for one one-hundredth of a second, will supply 11,650 pulses to the low order decade counter 28. These pulses when added to the preset value of 95,455 yield a sum stored in the counter of 107,105 which of course is displayed as 710 kilohertz.

In both FIGS. 1 and 4, the decade counter stages 25, 26, 27 and 28 are integrated circuit modules type N8280A having four binary coded decimal input lines that are enabled when the strobe line 59 of FIG. 4 or corresponding line 43 of FIG. 1 are grounded. All of these strobe inputs are tied together and carried to zero for a few microseconds at the beginning of each counting cycle. Isolation diodes similar to those illustrated in FIGS. 5a through 5c are needed to prevent interaction between the several preset registers 53, 55 and 57 of FIG. 4. The up-date generator 71 is constructed from a simple unijunction oscillator to provide output pulses at a rate of approximately 15 per second which is sufficiently high so that the display devices of FIG. 4 while in fact blinking at a rate of about 15 cycles per second appear due to the persistence of vision and the nature of the specific display devices to be energized constantly. The up-date generator is synchronized with the timing source by way of clock signals from the divider 67 and the output pulses from the up-date generator 71 are used to energize the strobe line 59 to prepare the counters for presetting and to actually accomplish this preset function. The output signals from the up-date generator are also applied to the gate selector and blanking generator 73 of FIG. 4 which is constructed of two interconnected J-K flip-flops and produces both the counting gate and blanking signals on lines 47 and 49 respectively. The display is extinguished by the blanking signal during the presetting and counting operations in order to avoid a confused display. The gate selector and blanking generator 73 is also synchronized by the clock signals from the divider 67 and is effective to enable the counting gate 37 for one one-hundredth of a second. This counting gate as well as the flip-flop 20'' is a simple two transistor flip-flop. The primary distinction between FIGS. 1 and 4 is the absence in FIG. 4 of the quad-latch memory circuits which function to keep the indicators energized constantly rather than blinking at a 15 cycle per second rate.

The visual display indicators are laid out in detail electrically at the top of FIG. 5a and one of the Numitron tubes is diagrammatically illustrated in detail in FIG. 6. A brief inspection of FIG. 6 will show that to display, for example, a three requires the energization of filaments A, B, G, C and D. As a second example to display a five, filaments A, F, G, C, and D would be energized. Each of the several Numitron filament elements is illustrated at the top of FIG. 5a driven by a transistor which is in turn energized by an appropriate one of the decoder output terminals. The other visual display devices illustrated at the top of FIG. 5a include the decimal point indicator 15, an AM indicator 75, an FM indicator 77, a UHF TV indicator 79 and a VHF TV indicator 81.

Thus, while the invention has been described with respect to two specific embodiments, numerous modifications will suggest themselves to those of ordinary skill in the art and accordingly the scope of the present invention is to be measured only by that of the appended claims.

What I claim is:

1. In a heterodyne receiving system having a digital tuning indicator which displays the frequency to which the system is tuned by ratioing a local oscillator output frequency by a predetermined factor, gating the thus ratioed frequency into a preset counter for a prescribed interval of time, and energizing a digital display device in response to the resultant count stored in said counter, the improved method of visibly indicating a channel number on said display device comprising the steps of: pratioing a local oscillator output frequency by a second predetermined amount, and presetting said counter to a count different from both the receiving system intermediate frequency and the complement thereof.

2. The improved method of claim 1 wherein the heterodyne receiving system comprises an FM broadcast receiver and a UHF television receiver, the digital tuning indicator normally providing a display of the FM broadcast frequency to which the system is tuned, the step of preratioing comprising the step of dividing by six the output frequency of the UHF television local oscillator and substituting that preratioed signal for the FM local oscillator output.

3. The improved method of claim 1 wherein said digital tuning indicator displays four digits, said improved method further comprising the step of suppressing two of said four digits.

4. The improved method of claim 2 wherein said digital tuning indicator displays four digits, said improved method further comprising the step of suppressing two of said four digits.

5. In a multiple band heterodyne receiving device having at least one local oscillator, an improved digital tuning indicator comprising:

a source of signals having the same frequency as said local oscillator;

divider means responsive to said signal source for providing an output having a frequency which is a submultiple of said local oscillator frequency;

counter means having an input and an output and adapted to increment by one for each cycle of a signal at said input;

means coupled to said divider means and to said counter input for supplying said submultiple frequency signal to said counter input for a predetermined time interval, said predetermined time interval being the same for different bands; and indicator means responsive to said counter output to provide a visual display of the count stored in said counter means at the end of said predetermined time interval.

6. The improved digital tuning indicator of claim 5 wherein said receiving device is a multiple band receiver comprising a plurality of local oscillators and wherein said divide means comprises a plurality of discrete divider units selectively inter-connectable so as to provide different submultiple frequencies for different bands.

7. The improved digital tuning indicator of claim 6 further comprising means for periodically resetting said counter means to a nonzero initial value, said nonzero initial value being different from both the receiving system intermediate frequency and the complement thereof for at least one band.

8. The improved digital tuning indicator of claim 6 further comprising means for suppressing at least one digital position of said indicator means when said receiver is operating on a specified one of said multiple bands.

9. In a multiple band heterodyne receiving system having a digital tuning indicator operative on at least one of said bands to display the frequency to which the system is tuned by ratioing the local oscillator output frequency for said one band by a predetermined factor, gating the thus ratioed frequency into a preset counter for a prescribed interval of time, and energizing a digital display means in response to the resultant count stored in said counter, the improvement comprising means for suppressing at least one decimal position in said digital display means when said receiver is operating on a band distinct from said one band whereby frequency is displayed for said one band whereas channel numbers may be displayed for said distinct band.

10. A digital tuning indicator for a heterodyne type receiver comprising:

a first plurality of decimal digit display means arranged in series and having a highest order digit position and a lower order digit position;

counter means having a second plurality of digital positions which is greater than said first plurality;

means for setting said counter means to a count indicative of said receiver tuning including a register for transferring on command to said counter means a number which corresponds to one of the receiver intermediate frequency and the complement thereof in its said first plurality of most significant digit positions and differs therefrom in at least one other digit position; and means for selectively energizing each said display means to display the count in a number of counter positions equal to said first plurality.

11. The digital tuning indicator of claim 10 wherein the highest order digit position selectively displays only a one and the lack thereof in response to the state of the corresponding highest order counter digital position, said corresponding counter position comprising a single flip-flop, the remaining counter positions and the remaining display positions being ten state devices, each state corresponding to one of the decimal digits zero through nine.

12. The digital tuning indicator of claim 10 wherein said first plurality is four and said second plurality is five.

13. The digital tuning indicator of claim 10 further comprising means for suppressing at least the highest order digit position and the lowest order digit position of said display means whereby channel numbers rather than frequency may be displayed.

* * * * *